C. BEYSCHLAG.
ARTIFICIAL PRODUCTION OF MINERAL WATERS.

No. 190,464. Patented May 8, 1877.

Witnesses:
Thomas Gray
Wm Gray

Inventor:
Charles Beyschlag

2 Sheets—Sheet 2.

C. BEYSCHLAG.
ARTIFICIAL PRODUCTION OF MINERAL WATERS.

No. 190,464. Patented May 8, 1877.

Witnesses:
Thomas Gray
Wm Gray

Inventor:
Charles Beyschlag

UNITED STATES PATENT OFFICE.

CHARLES BEYSCHLAG, OF INDIANAPOLIS, INDIANA.

IMPROVEMENT IN ARTIFICIAL PRODUCTION OF MINERAL WATERS.

Specification forming part of Letters Patent No. 190,464, dated May 8, 1877; application filed January 20, 1877.

*To all whom it may concern:*

Be it known that I, CHARLES BEYSCHLAG, of Indianapolis, in the county of Marion and State of Indiana, have invented a new and useful Improvement in the Artificial Production of Mineral Waters, which improvement is fully set forth in the following specification, reference being had to the accompanying drawings.

The object of my invention is to render unnecessary any extra fountains, cylinders, and coolers, which at present must be employed for the artificial production of mineral waters, substituting therefor my mineral-water-producing faucet, which can be immediately attached to any soda-water apparatus by connecting it with the regular cooler used for the soda-water.

Figure 1:
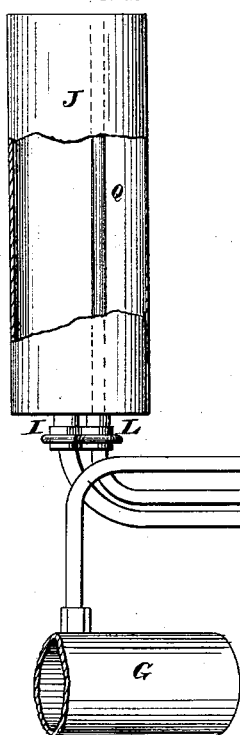
Figure 1:
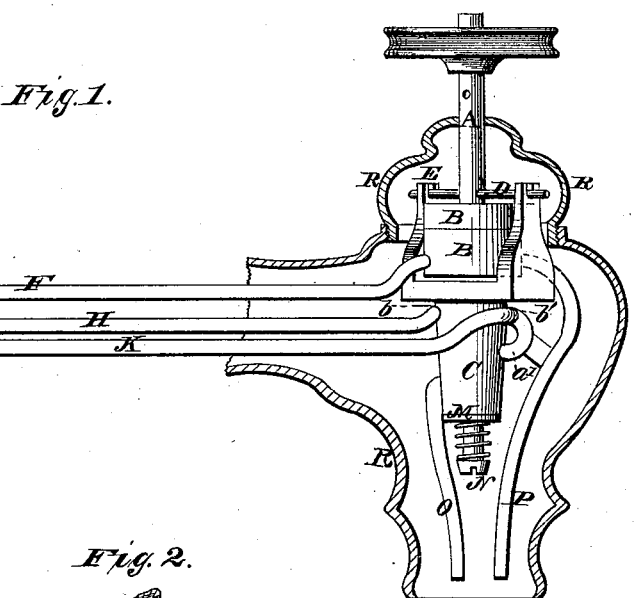

Figure 1 shows the internal arrangement of the mineral-water-producing faucet, A representing the wheel, which simultaneously acts on the soda-water faucet B B and the mineral - water - solution faucet C C—on the first named by means of the screw of wheel A, and on the second named by means of the small horizontal bar D, attached to wheel A, and the forks E, attached to mineral-water-solution faucet C C. F is the soda-water pipe attached to soda-water cooler G. H is one of the mineral-water-solution pipes, connected by means of screw I with the can J, holding the mineral-water solution. K is the other mineral - water - solution pipe and the measuring-pipe proper, connected by means of screw L with the can J, holding the mineral-water solution. M is a plate to keep the stem of the mineral-water-solution faucet C C in proper position by means of screw N. O is the final discharge-pipe for the mineral-water solution, and P the final discharge-pipe for the soda-water. Q is the vent-tube of the mineral-water-solution-measuring pipe K. R R R R is a sectional view of fancy faucet, in the inside of which the whole machinery rests.

Figure 2:
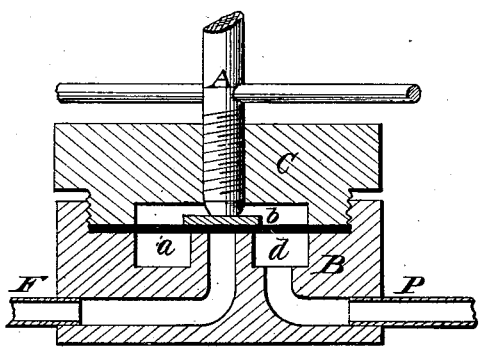

Fig. 2 is an enlarged sectional view of a soda-water faucet generally in use. F is pipe attached to soda-water cooler G. *a* is rubber washer, held down by metal plate *b*; and A, the wheel, which works in the head *c* of the faucet B by means of the screw. When the screw is loosened the pressure of the soda-water raises washer *a*, and it flows into the space *d*, and from thence out of pipe P.

Figure 3:
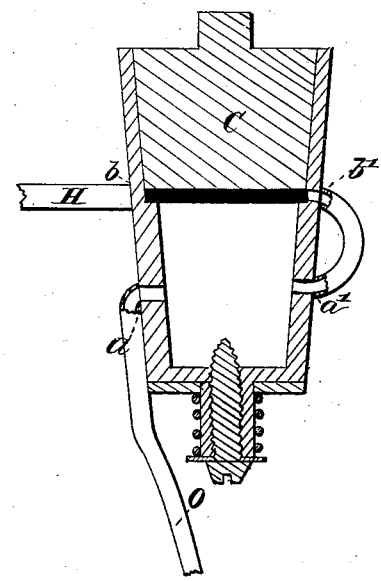
Figure 5:
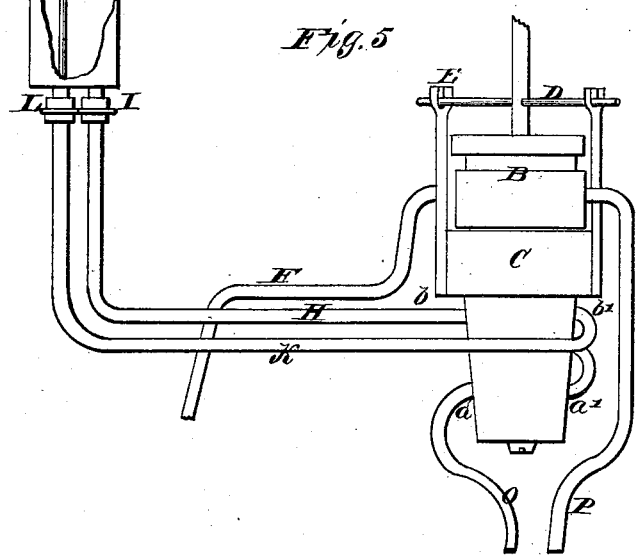

Fig. 3 represents an enlarged sectional view of mineral-water-solution faucet C C, and is constructed, as will be seen, so that if open at *b b'* it will be closed at *a a'*. It will be evident that a quarter-turn of C will reverse this condition, and close *b b'* while opening *a a'*.

Figure 4:
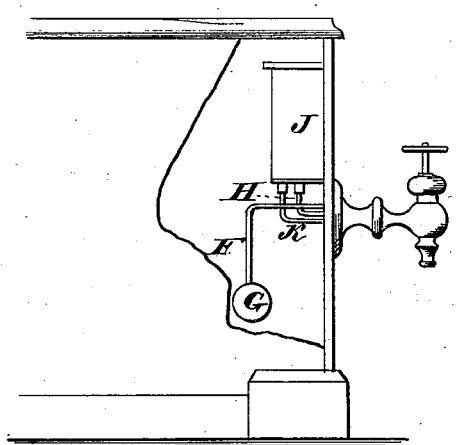

Fig. 4 represents the mineral-water-producing faucet in proper position, attached to a soda-water apparatus. J is the can holding the mineral-water solution. G is the soda-water cooler. K is the mineral-water-solution-measuring pipe; H, the other mineral-water-solution pipe.

The *modus operandi* of the mineral-water-producing faucet is as follows: I give wheel A a quarter-turn from left to right, which opens soda-water faucet B B and simultaneously closes the mineral-water-solution faucet C C at *b b'*, and opens it at *a a'*. This allows the contents of the mineral-water-solution-measuring pipe K to run out at O, while at the same time the soda-water is discharged at P. The mineral-water solution being measured, and having the required strength for one glass, it thus instantly produces, together with the soda-water, the mineral water. A quarter-turn of wheel A back will close soda-water faucet B B again, and also close mineral-water-solution faucet C C at *a a'*, and open it at *b b'*, allowing the mineral-water solution to fill up the pipe K to the level of the mineral-water solution in the can J, thus making the faucet ready for the next draft of mineral water.

I lay no claim to the soda-water faucet, as they are in general use. I am also aware that mineral-water solutions are in use for the artificial production of mineral waters; but, as far as I am aware, it requires extra coolers and an extra cylinder or fountain for their production, as the mineral-water solution must be placed in a fountain or a cylinder, then filled with soda-water and drawn through a cooler. Extra cylinders, fountains, and coolers are rendered unnecessary by the mineral-water-producing faucet.

I claim as my invention two essential features, namely:

1. The combination of a soda-water faucet, B, and the mineral-water-solution faucet C, pipes F, H, K, O, and P, forks E, bar D, and wheel A, with can J and pipe O therein, substantially as and for the purpose specified.

2. The combination of wheel A, forks E, and bar D, which enables a simultaneous operation on soda-faucet B and mineral-water-solution faucet C, all substantially as and for the purpose specified.

CHARLES BEYSCHLAG.

Witnesses:
 THOMAS GRAY
 WM. GRAY.